(12) United States Patent
Ronning et al.

(10) Patent No.: US 11,888,356 B2
(45) Date of Patent: Jan. 30, 2024

(54) ELECTRIC DRIVE MODULE HAVING MOTOR WITH HEAT SINK INSERT IN ROTOR SHAFT

(71) Applicant: American Axle & Manufacturing, Inc., Detroit, MI (US)

(72) Inventors: Jeffrey J. Ronning, Grosse Pointe Farms, MI (US); James P. Downs, South Lyon, MI (US); John Morgante, Sterling Heights, MI (US); Peter D. Fischer, Fishers, IN (US); David Crecelius, Cicero, IN (US); Zugang Huang, Troy, MI (US); Paul J. Valente, Berkley, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 18/115,909

(22) Filed: Mar. 1, 2023

(65) Prior Publication Data
US 2023/0208228 A1     Jun. 29, 2023

Related U.S. Application Data

(63) Continuation of application No. 16/751,596, filed as application No. PCT/US2018/045785 on Aug. 8, 2018, now Pat. No. 11,626,765.

(Continued)

(51) Int. Cl.
*H02K 9/19* (2006.01)
*H02K 1/32* (2006.01)
(Continued)

(52) U.S. Cl.
CPC .................. *H02K 1/32* (2013.01); *H02K 9/19* (2013.01); *H02K 5/1732* (2013.01); *H02K 7/083* (2013.01)

(58) Field of Classification Search
CPC ........ H02K 1/32; H02K 5/1732; H02K 7/083; H02K 9/19
(Continued)

(56) References Cited

U.S. PATENT DOCUMENTS 6,191,511 B1   2/2001  Zysset
7,049,717 B2   5/2006  Frank et al.
(Continued)

FOREIGN PATENT DOCUMENTS

CN   106887914 A      6/2017
DE   102015214309 A1  10/2012
(Continued)

OTHER PUBLICATIONS

PCT International Search Report dated Nov. 28, 2018 for corresponding PCT application No. PCT/US2018/045785, filed Aug. 8, 2018.

*Primary Examiner* — Terrance L Kenerly
(74) *Attorney, Agent, or Firm* — Reising Ethington P.C.

(57) ABSTRACT

A motor drive system with a rotor assembly having an insert, which is received into a blind hollow rotor space in a rotor shaft. The insert is unitarily and integrally formed and defines a central hole, which is disposed along a rotational axis of the rotor assembly, and a plurality of slots that extend through an outer circumferential surface of the insert. The insert is disposed in the rotor shaft such that the outer circumferential surface of the insert is engaged to the inside circumferential surface of the rotor shaft. The central hole forms a first fluid passage through the insert, while the slots form a plurality of second fluid passages through the insert.

12 Claims, 16 Drawing Sheets

Related U.S. Application Data

(60) Provisional application No. 62/542,452, filed on Aug. 8, 2017.

(51) Int. Cl.
*H02K 5/173* (2006.01)
*H02K 7/08* (2006.01)

(58) Field of Classification Search
USPC .......................................................... 310/59
See application file for complete search history.

(56) References Cited

U.S. PATENT DOCUMENTS

| | | |
|---|---|---|
| 7,489,057 B2 | 2/2009 | Zhou et al. |
| 7,579,725 B2 | 8/2009 | Shou et al. |
| 8,704,414 B2 | 4/2014 | Rai et al. |
| 8,970,074 B2 | 3/2015 | Wagner et al. |
| 9,083,214 B2 | 7/2015 | Yamamoto et al. |
| 9,787,164 B2 | 10/2017 | Büttner et al. |
| 10,033,250 B2 | 7/2018 | Tremelling et al. |
| 2005/0047912 A1 | 3/2005 | Giesler et al. |
| 2008/0023177 A1 | 1/2008 | Hassett et al. |
| 2014/0368064 A1 | 12/2014 | Fedoseyev et al. |
| 2015/0069861 A1* | 3/2015 | Buttner .................... H02K 9/14 310/43 |
| 2015/0288255 A1 | 10/2015 | Barker et al. |
| 2018/0191224 A1 | 7/2018 | Kötschau et al. |
| 2019/0203818 A1 | 7/2019 | Broker et al. |

FOREIGN PATENT DOCUMENTS

| | | | |
|---|---|---|---|
| DE | 102015204721 A1 | 6/2016 | |
| DE | 1102016202416 A1 | 8/2017 | |
| DE | 102016225523 A1 | 6/2018 | |
| DE | 102018130557 A1 | 6/2020 | |
| GB | 2501952 A | 11/2013 | |
| GB | 2552678 A | 2/2018 | |
| JP | 6225730 * | 11/2017 | ............... H02K 9/09 |
| KR | 20160057017 B1 | 3/2017 | |
| WO | WO2008004286 A1 | 1/2008 | |

* cited by examiner

ELECTRIC DRIVE MODULE HAVING MOTOR WITH HEAT SINK INSERT IN ROTOR SHAFT

CROSS-REFERENCE TO RELATED APPLICATIONS

This application is a continuation of U.S. patent application Ser. No. 16/751,596 filed Jan. 24, 2020, which is a national stage entry of International Application No. PCT/US2018/045785 filed Aug. 8, 2018, which claims the benefit of U.S. Provisional Patent Application No. 62/542,452 filed Aug. 8, 2017. The disclosure of each of the above-referenced applications is incorporated by reference as if fully set forth in detail herein.

FIELD

The present disclosure relates to an electric drive module having a motor with a heat sink insert in a rotor shaft.

BACKGROUND

This section provides background information related to the present disclosure which is not necessarily prior art. U.S. Pat. No. 7,489,057 discloses an electric motor having a rotor with a blind hollow shaft into which a feed tube and a support member are received. The feed tube is disposed concentrically about along the rotational axis and includes an inlet end, which extends from the blind hollow shaft, and an outlet end that is spaced apart from a radial wall in the blind hollow shaft. The support member is disposed radially between the feed tube and an inside circumferential surface of the hollow shaft and extends helically about the feed tube. During operation of the motor, a coolant fluid is pumped into the inlet end of the feed tube as the hollow shaft rotates. Fluid that exits the outlet end of the feed tube flows between the feed tube and the inside circumferential surface of the hollow shaft. The support member causes the coolant fluid to flow circumferentially about the feed tube as the coolant fluid travels in an axial direction back toward the inlet end of the feed tube.

SUMMARY

This section provides a general summary of the disclosure, and is not a comprehensive disclosure of its full scope or all of its features.

In one form, the present disclosure provides a motor drive system that includes an electric motor having a stator and a rotor assembly. The stator is disposed about at least a portion of the rotor assembly. The rotor assembly is rotatable relative to the stator about a rotational axis and has a rotor shaft, a first end wall, an insert, a coolant inlet and a coolant outlet. The rotor shaft has a shaft wall that is disposed about the rotational axis of the rotor assembly and defines a hollow rotor space. The first end wall is coupled to the rotor shaft to close an end of the hollow rotor space. The insert received in the hollow rotor space of the rotor shaft and has an insert body, a first flow passage and a plurality of second flow passages. The insert body has an outer insert surface that is engaged to an inside surface of the shaft wall. The first flow passage extends longitudinally through the insert body. Each of the second flow passages extends longitudinally through the insert body radially between the outer insert surface and the first flow passage. The coolant inlet is fluidly coupled to one of the first flow passage and the second flow passages. The coolant outlet is fluidly coupled to the other one of the first flow passage and the second flow passages.

In another form, the present disclosure provides an insert for a hollow rotor shaft. The insert has a longitudinal axis and includes an insert body that defines a first flow passage, a plurality of second flow passages and a flow interruption groove. The insert body has an outer insert surface that is configured to be engaged to an inside surface of the hollow rotor shaft. The first flow passage extends longitudinally through the insert body. Each of the second flow passages extends longitudinally through the insert body radially between the outer insert surface and the first flow passage. The flow interruption groove is formed through the outer insert surface and intersects at least a portion of the second flow passages.

In still another form, the present disclosure provides a motor drive system that includes an electric motor having a stator and a rotor assembly that is received in the stator for rotation about a rotational axis. The rotor assembly has a rotor shaft and a coolant fluid circulating device that is received in the rotor shaft. The rotor shaft has a shaft wall that is disposed circumferentially about the rotational axis and which defines a hollow rotor space. The coolant fluid circulating device is received in the hollow rotor space and is fixedly coupled to the shaft wall. The coolant fluid circulating device has a first flow passage, which is disposed along the rotational axis, and a plurality of second flow passages that are disposed radially between the first flow passage and the shaft wall.

In some examples the cooling fluid circulating device includes a central tube, a plurality of fin sets and an outer tube. The central tube defines the first flow passage. The outer tube is disposed concentrically about the central tube. The fin sets are fixedly coupled to an outside surface of the central tube. Each of the fin sets has a plurality of fin members that extend radially outwardly from the central tube. The fin members have a distal surface in contact with an inside surface of the outer tube. The outer tube has an outer surface that is in contact with a surface on the shaft wall.

In other examples the cooling fluid circulating device can include a unitarily and integrally formed insert having an outer peripheral surface that engages an inner peripheral surface of the shaft wall. The first flow passage is a hole formed centrally through the insert, and the second flow passages are disposed circumferentially about the hole.

In still further examples the cooling fluid circulating device includes an insert having a plurality of segments that are fixedly coupled to one another. Each of the segments defines a first through hole and a plurality of second through holes. The first through holes of adjacent segments are disposed in fluid communication with one another such that the first through holes form the first follow passage. The second through holes of adjacent segments are in fluid communication with one another and form the plurality of second flow passages.

In yet other examples the cooling fluid circulating device includes an insert having an outer insert surface that is engaged to an inside surface of the shaft wall. The first flow passage extends longitudinally through the insert. Each of the second flow passages extending longitudinally through the insert.

In a further form, the teachings of the present disclosure provide an electric motor having a stator and a rotor assembly that is received in the stator and rotatable about a rotational axis. The rotor assembly has a rotor shaft and single fin set. The rotor shaft defines a bore with an inner circumferential surface that is disposed longitudinally along the rotational axis. The single fin set is unitarily and integrally formed and has a hub and a plurality of fin members. A central hole is formed through the hub along the rotational axis. The fin members are fixedly coupled to the hub and extend radially outwardly therefrom. The fin members cooperate to define an outer circumferential surface of the single fin set. The fin members are spaced circumferentially apart from one another about the rotational axis to define a plurality of longitudinally extending slots. The single fin set is received into the bore in the rotor shaft such that the outer circumferential surface of the single fin set engages the inner circumferential surface of the bore in the rotor shaft. Each of the longitudinally extending slots is bounded on a radially outer side by the inner circumferential surface of the bore in the rotor shaft. The central hole forms a first fluid passage that is configured to transmit cooling fluid through the single fin set in a first direction along the rotational axis. The longitudinally extending slots form a plurality of second fluid passages that are configured to transmit cooling fluid through the single fin set in a second direction along the rotational axis that is opposite the first direction.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
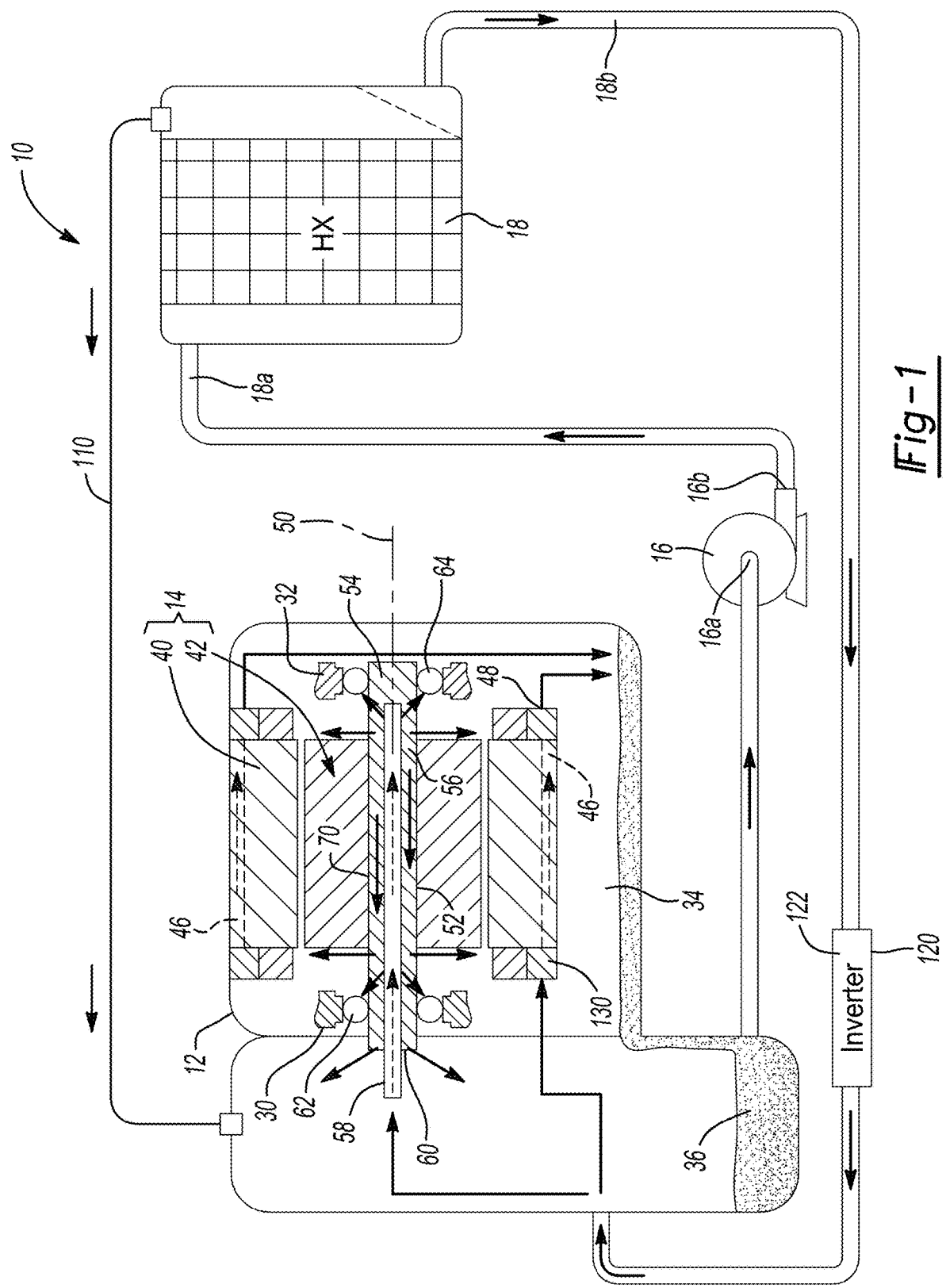
FIG. 1 is a schematic illustration of an exemplary motor drive system constructed in accordance with the teachings of the present disclosure.

With reference to FIG. 1 of the drawings, an exemplary motor drive system constructed in accordance with the teachings of the present disclosure is generally indicated by reference numeral 10. The motor drive system 10 can include a housing 12, an electric motor 14, a pump 16, and a heat exchanger 18.

The housing 12 can have first and second bearing sites 30 and 32, respectively, and can define a cavity 34 and a sump 36. The electric motor 14 can be received in the cavity 34. The sump 36 can be in fluid communication with the cavity 34 and can hold a predetermined quantity of an appropriate cooling fluid. In the example provided, the cooling fluid is a type of automatic transmission fluid, but it will be appreciated that other types of fluids, including water-based fluids, could be employed in the alternative.

The electric motor 14 can be any type of electric motor, such as an AC induction motor or a permanent magnet motor, and can include a stator 40 and a rotor assembly 42. The stator 40 can be fixedly mounted to the housing 12 and can be disposed circumferentially about at least a portion of the rotor assembly 42. The stator can define one or more stator coolant passages 46 that are formed therethrough. Each of the stator coolant passages 46 can have an outlet 48 that can discharge fluid communicated therethrough into the cavity 34, where it can drain to the sump 36.

The rotor assembly 42 can be rotatable about a rotational axis 50 and can have a rotor shaft 52, an end wall 54, an insert 56, a coolant inlet 58 and a coolant outlet The rotor shaft 52 can be supported for rotation relative to the first bearing site 30 and the second bearing site 32 via a first bearing 62 and a second bearing 64, respectively. The rotor shaft 52 can have a shaft wall 70 that is disposed about the rotational axis 50 of the rotor assembly 42 and defines a hollow rotor space. In the embodiment illustrated, the rotor shaft 52 is shaped as a hollow right cylinder, but it will be appreciated that the rotor shaft 52 could be shaped differently. The end wall 54 can be coupled to the rotor shaft 52 to close an end of the hollow rotor space. In the particular example provided, the end wall 54 is integrally and unitarily formed with the shaft wall 70, but it will be appreciated that the end wall 54 could be coupled to the shaft wall 70 in a desired manner, such as press-fitting or welding.

Figure 2:
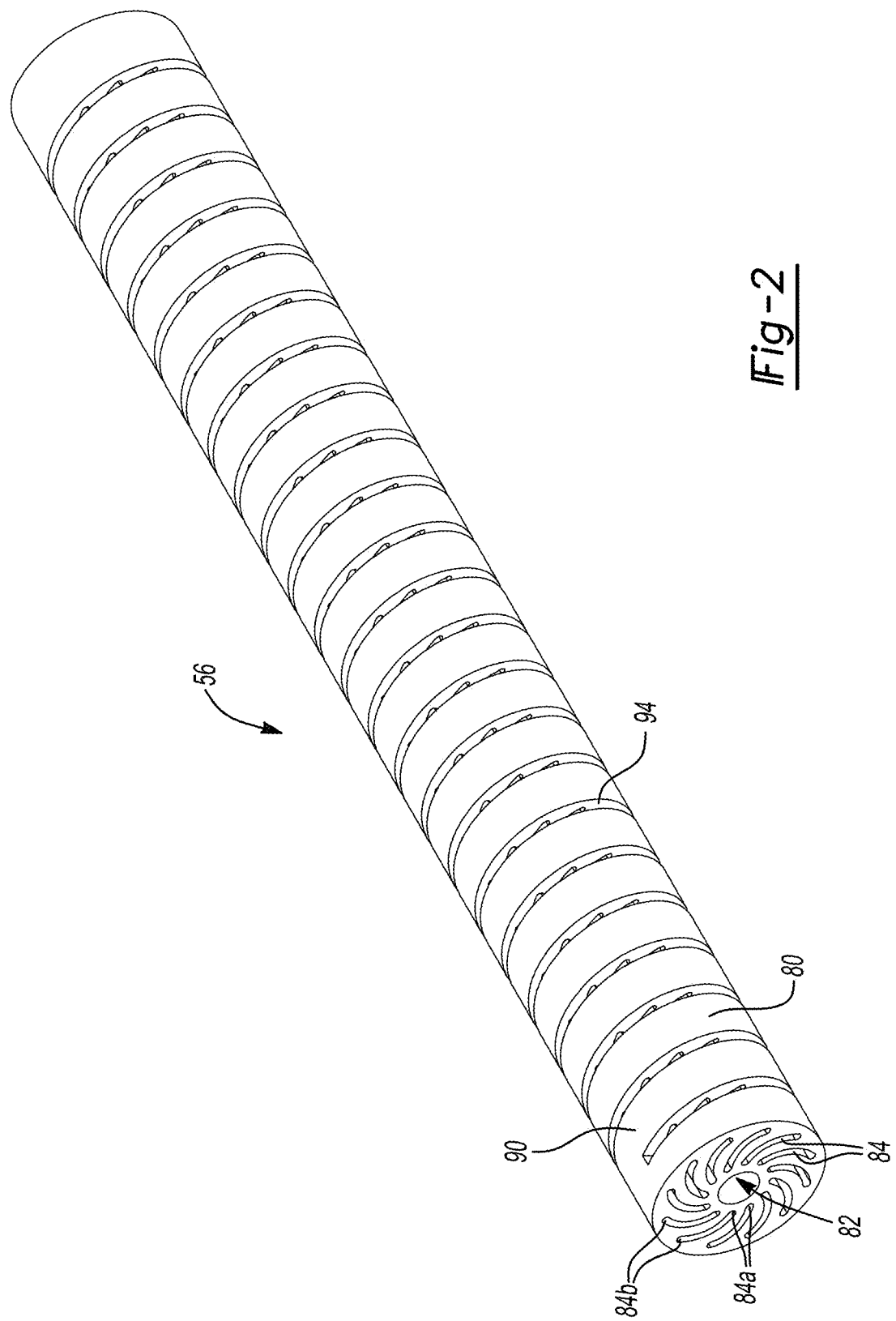
FIG. 2 is a perspective view of an insert for a rotor of an electric motor of the motor drive system.
Figure 3:
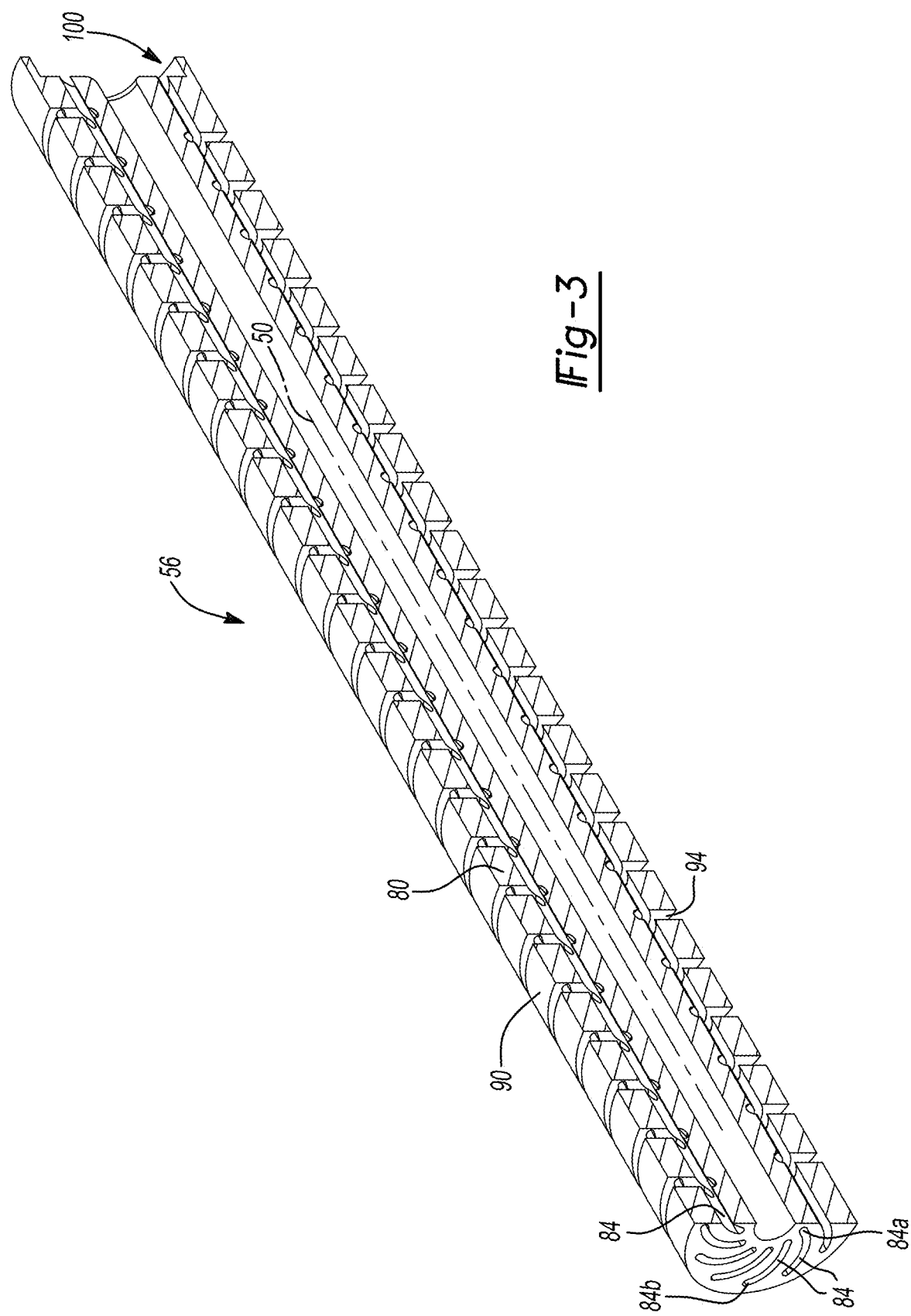
FIG. 3 is a sectioned perspective view of the insert.

With reference to FIGS. 2 and 3, the insert 56 can have an insert body 80, a first flow passage 82 and a plurality of second flow passages 84. The insert 56 can be received in the hollow rotor space of the rotor shaft 52 such that the first flow passage 82 and the plurality of second flow passages 84 terminate at respective locations that are spaced apart from the end wall 54.

The insert body 80 can have an outer insert surface 90 that is engaged to an inside surface of the shaft wall 70 (FIG. 1). In the example provided, the insert 56 is coupled to the shaft wall 70 (FIG. 1) via an interference fit (e.g., press fit or shrink fit) and as such, the outer insert surface 90 directly contacts the inside surface of the shaft wall (FIG. 1). It will be appreciated, however, that the insert 56 could be slidably received into the rotor shaft 52 (FIG. 1) and an appropriate material, such as an adhesive (e.g., a thermally conductive adhesive), can be employed to fixedly couple the insert 56 to the shaft wall 70 (FIG. 1).

The first flow passage 82 can extend longitudinally through the insert body In the particular example provided, the first flow passage 82 is disposed along the rotational axis 50 of the rotor assembly 42 (FIG. 1). Each of the second flow passages 84 can extend longitudinally through the insert body 80 radially between the outer insert surface 90 and the first flow passage 82. In the example provided, each of the second flow passages 84 has a first radial end 84a, which is disposed proximate the first flow passage 82, and a second radial end 84b that is disposed radially outwardly from the first radial end 84a and proximate the outer insert surface 90. Optionally, the second radial end 84b can be offset in a circumferential direction (about the rotational axis 50) from the first radial end 84a in a lateral cross-section of the insert 56 that is taken perpendicular to the rotational axis 50 of the rotor assembly 42 (FIG. 1). In this lateral cross-section, the second flow passages 84 can be shaped in a desired manner, such as in an arcuate manner.

With reference to FIGS. 1 and 2, the coolant inlet 58 can be fluidly coupled the first flow passage 82 and the coolant outlet 60 can be fluidly coupled to the second flow passages 84. It will be appreciated, however, that the coolant outlet 60 could be fluidly coupled to the first flow passage 82 and the coolant inlet 58 could be fluidly coupled to the second flow passages 84 in the alternative. In the example provided, the coolant inlet 58 is a tube that is fixedly coupled to the housing 12, disposed coaxially with the first flow passage 82, and projects toward the insert 56 so as to dispense fluid that flows through the coolant inlet 58 into the first flow passage 82. The tube can be sized such that its inside diameter is approximately equal to the inside diameter of the first flow passage 82 and the tube can terminate near (but not touch) the insert 56. It will be appreciated that the tube and the first flow passage 82 could be configured differently to avoid contact between the coolant inlet 58 and the insert 56. In one alternative arrangement, a portion of the first flow passage 82 can be sized to receive (but not touch) the tube. For example, the first flow passage 82 can define a counterbore (not shown) that can be larger in diameter than the outside diameter of the tube by a predetermined amount, such as 1 mm. The coolant outlet 60 can be formed by the open ends of the second coolant passages 84 that extend through the axial end of the insert body 80 on a side of the insert 56 proximate the coolant inlet 58.

Figure 4:
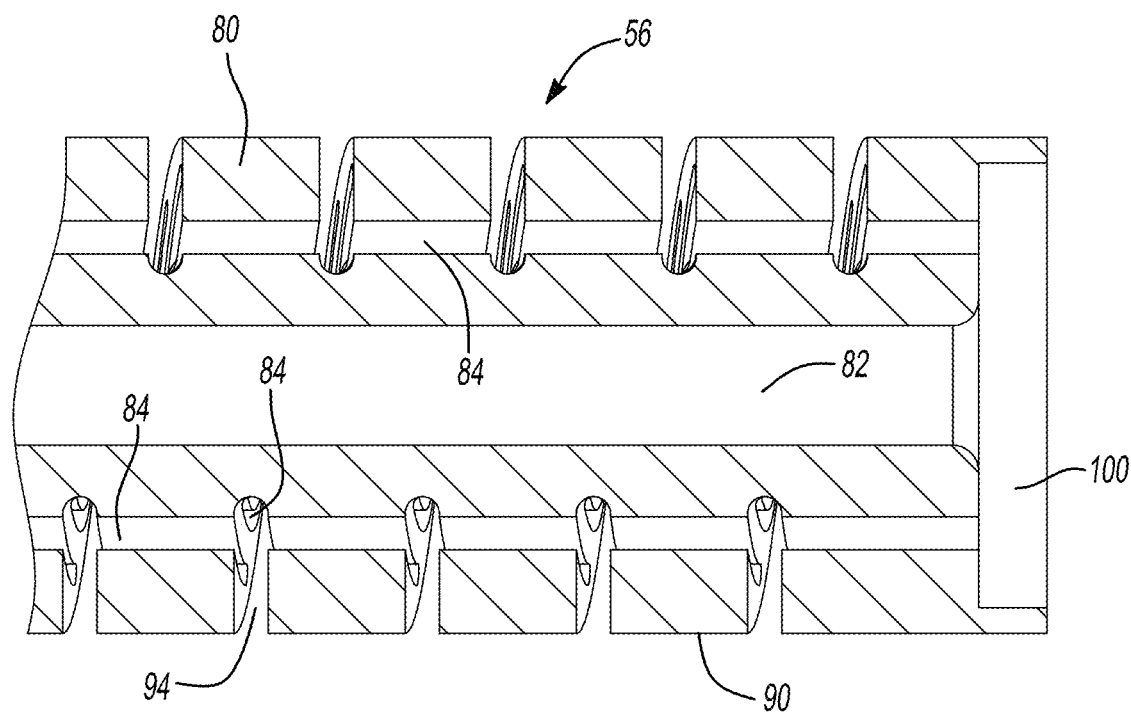
FIG. 4 is a portion of a longitudinal section view of the insert.

With reference to FIGS. 2 through 4, the insert body 80 can optionally define a flow interruption groove 94 that is formed through the outer insert surface 90 and intersects at least a portion of the second flow passages 84. In the particular example provided, the flow interruption groove 94 intersects each of the second flow passages 84. The flow interruption groove 94 can be formed such that at least a portion of it has a spiral shape. The flow interruption groove 94 can be coupled in fluid communication to the coolant outlet 60 (FIG. 1).

Figure 5:
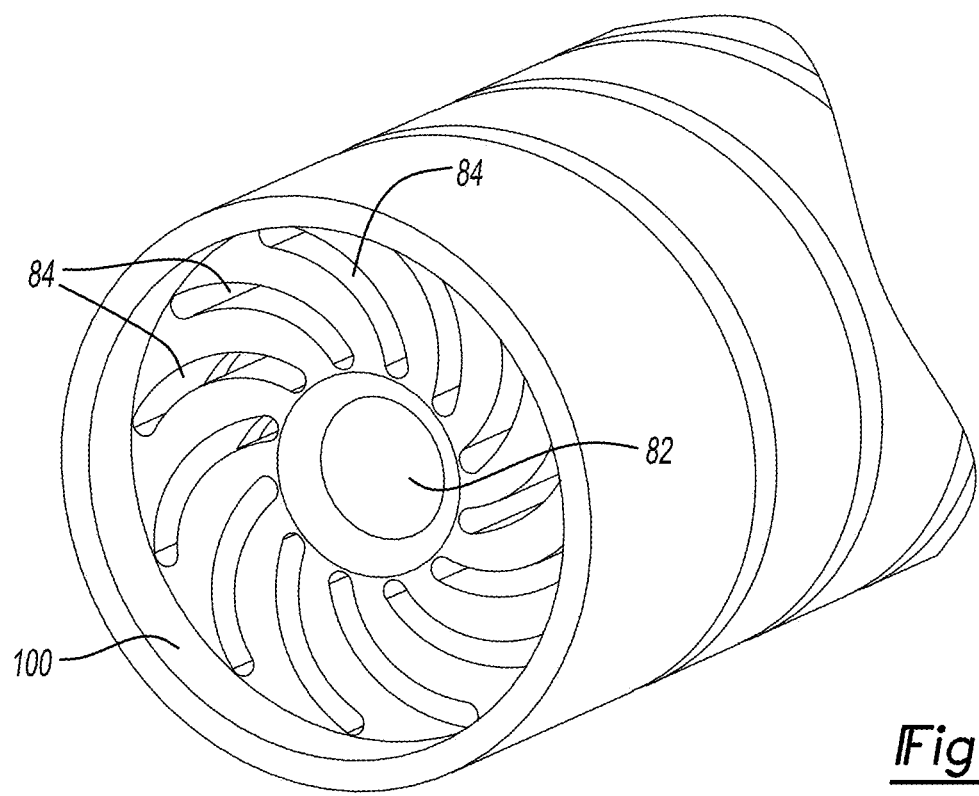
FIG. 5 is a perspective view of an end of the insert.

With reference to FIGS. 3 through 5, an internal bore 100 can optionally be formed into an axial end of the insert body 80 that is disposed proximate the end wall 54 (FIG. 1). The internal bore 100 can intersect the first flow passage 82 and the second flow passages 84. The internal bore 100 is configured to permit the axial end of the insert 56 to be abutted directly against the end wall 54 without adversely effecting fluid communication between the first flow passage 82 and the second flow passages 84. If desired, the outlet end of the first flow passage 82 can be contoured in a desired manner, such as with a fillet radius.

Returning to FIG. 1, the pump 16 can have a pump inlet 16a, which can be coupled in fluid communication to the sump 36 in the housing 12, and a pump outlet 16b that can be coupled in fluid communication to an inlet 18a of the heat exchanger 18. The heat exchanger 18 is configured to facilitate an exchange of heat between the fluid flowing through the heat exchanger 18 and another fluid or structure, such the air that is disposed about the heat exchanger 18. The heat exchanger 18 can optionally be configured to deaerate fluid that is input to the heat exchanger 18 by the pump 16. An air management line 110 can fluidly couple the heat exchanger 18 to the cavity 34 in the housing 12 to permit the air that is removed from the fluid in the heat exchanger 18 to be returned to the housing 12 so that air bubbles do not circulate around the fluid loop nor create large void spaces that affect the fluid level of the sump 36. Cooled fluid exiting the heat exchanger 18 through an outlet 18b of the heat exchanger 18 can be routed back to the housing 12. In the example provided, the cooled fluid exiting the outlet 18b of the heat exchanger 18 is initially circulated through an auxiliary heat exchanger 120 to remove heat from an inverter 122 that supplies the electric motor 14 with electrical energy before the fluid is returned to the housing 12.

Cooled fluid returned to the housing 12 can be routed to the stator 40 and the rotor assembly 42 for their cooling. In this regard, a first portion of the fluid returned to the housing 12 can be directed to cool the stator 40, while a second portion of the fluid returned to the housing 12 can be directed to cool the rotor assembly 42. The portion of the coolant that is employed to cool the stator 40 can be directed into a manifold 130 that is mounted to the stator 40. Fluid exiting the manifold 130 can be received into the stator coolant passages 46, flow through the stator 40 and can be discharged from the stator 40 into the cavity 34 in the housing 12 where the fluid discharged from the stator 40 can collect in the sump 36. The portion of the coolant that is employed to cool the rotor assembly 42 can be received by the coolant inlet 58. With additional reference to FIG. 3, the first coolant passage 82 is coupled in fluid communication with the coolant inlet 58 in the example provided so that fluid input to the rotor assembly 42 initially flows through the first coolant passage 82 toward the end wall 54. Coolant exiting the first coolant passage 82 (at a location proximate the end wall 54) flows into the second coolant passages 84 where it is directed in an axial direction toward the coolant outlet 60 (i.e., in an axial direction away from the end wall 54). If the insert 56 is equipped with a flow interruption groove 94 that intersects one or more of the second coolant passages 84, fluid can additionally flow from the (intersected) second coolant passages 84 into the flow interruption groove 94 to cause fluid flow against the inside surface of the hollow shaft wall 70.

It will be appreciated that an intersection between the flow interruption groove 94 and any one of the second coolant passages 84 will tend to break up laminar flow (and possibly cause turbulence) at the intersection to improve the rate at which heat is transferred from the shaft wall 70 and/or the insert 56 to the fluid. In the example provided, the flow interruption groove 94 intersects the second coolant passages 84 at different points along the path or length of the flow interruption groove 94 to thereby break up laminar flow and possibly cause turbulence at multiple points along the path or length of the flow interruption groove 94.

Fluid discharged from the coolant outlet 60 can be directed to the sump 36 in the housing 12. Optionally, the fluid discharged from the coolant outlet 60 can be employed to lubricate a device or mechanism (not shown) that is being provided rotary power by the electric motor 14. The device or mechanism could include a transmission, such as a multi-speed transmission, and/or a differential mechanism that supplies rotary power to a pair of outputs. Also optionally, fluid can be discharged from the coolant outlet the first fluid passage 82, one or more of the second coolant passages 84 and/or the flow interruption groove 94 to lubricate the first and second bearings 62 and 64. For example, small diameter holes (not specifically shown) can be formed through the shaft wall 70 and can intersect the flow interruption groove 94 to direct pressurized fluid in the flow interruption groove 94 radially outwardly (in a spray) to lubricate the first and second bearings 62 and 64. Alternatively, one or more holes (not shown) can be formed through the shaft wall 70 to permit fluid to be discharged into a passage or cavity (not shown) formed in the housing that can direct the fluid to a desired area, such as the first and second bearings 30 and 32.

Figure 6:
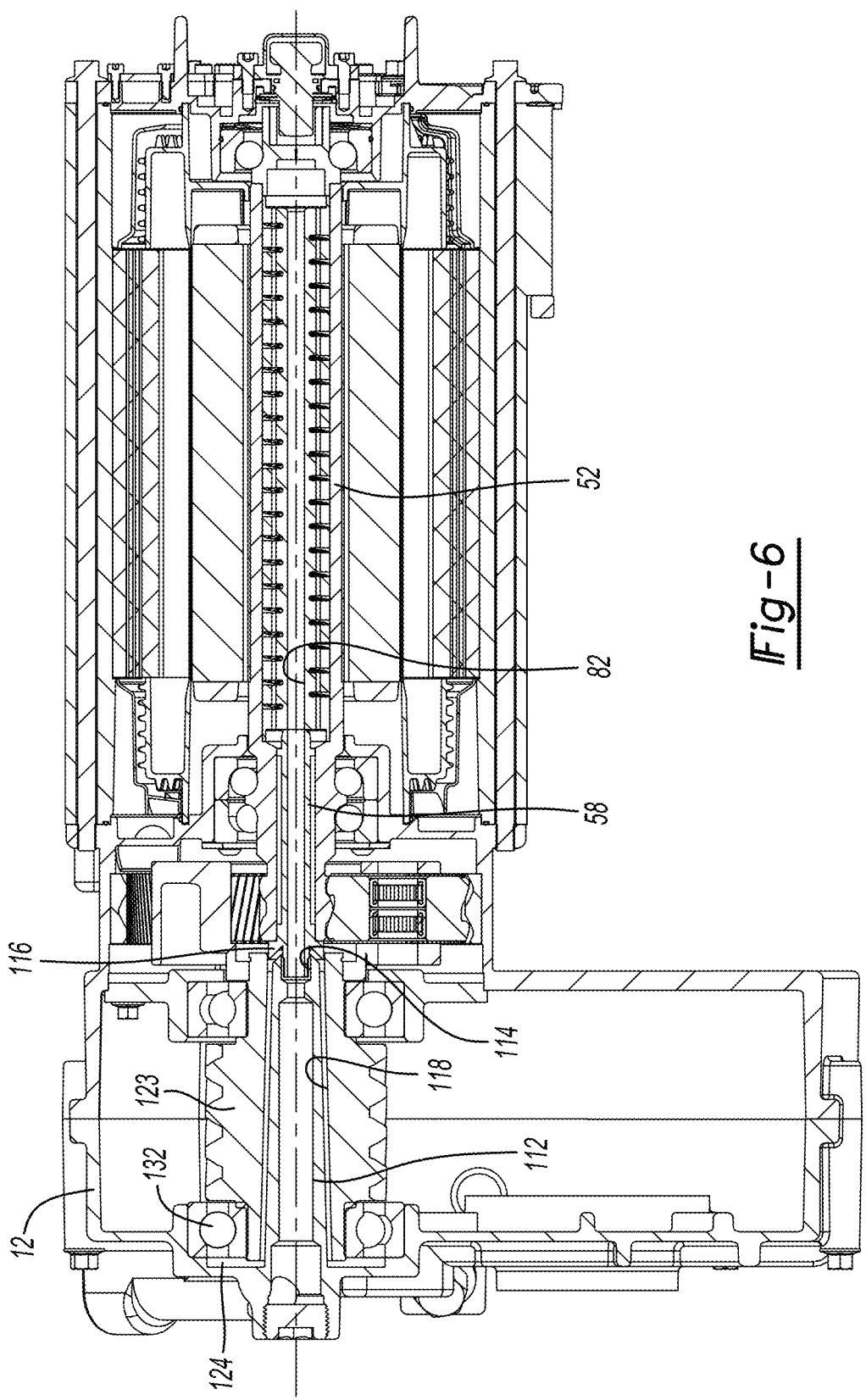
FIG. 6 is a cross-sectional view of a portion of another motor drive system constructed in accordance with the teachings of the present disclosure.

In the example of FIG. 6, the coolant inlet 58 is a tube that is received coaxially within the rotor shaft 52 and is fixedly and non-rotatably coupled to the rotor shaft 52. A conduit 112 that is fixedly coupled to the housing 12 is configured to transmit a pressurized coolant/lubricant, such as automatic transmission fluid, into the coolant inlet 58. More specifically, the coolant inlet 58 is rotatably received into the conduit 112 but spaced axially apart by a relatively small dimension. Pressurized coolant/lubricant that leaks through a radial gap 114 between the conduit 112 and the coolant inlet 58 can contact a shoulder 116 that is formed on the coolant inlet 58. The shoulder 116 can be shaped to direct pressurized fluid that has leaked through the radial gap 114 between an internal aperture 118 in a gear 120 and the conduit 112. The coolant/lubricant between in the internal aperture 118 can be directed by the housing 12 to an annular cavity 124 where it can flow into a bearing 130 to lubricate the bearing 130. In the example provided, the bearing 130 supports the gear 120 for rotation about the conduit 112 relative to the housing 12, but it will be appreciated that the bearing 130 could support another component. Additionally or alternatively, through holes (not shown) could be formed through the gear 120 to permit coolant/lubricant in the internal aperture 118 in the gear 120 to be fed radially through the gear 120 to provide lubrication to the teeth of the gear 120 and/or to another component.

Figure 7:
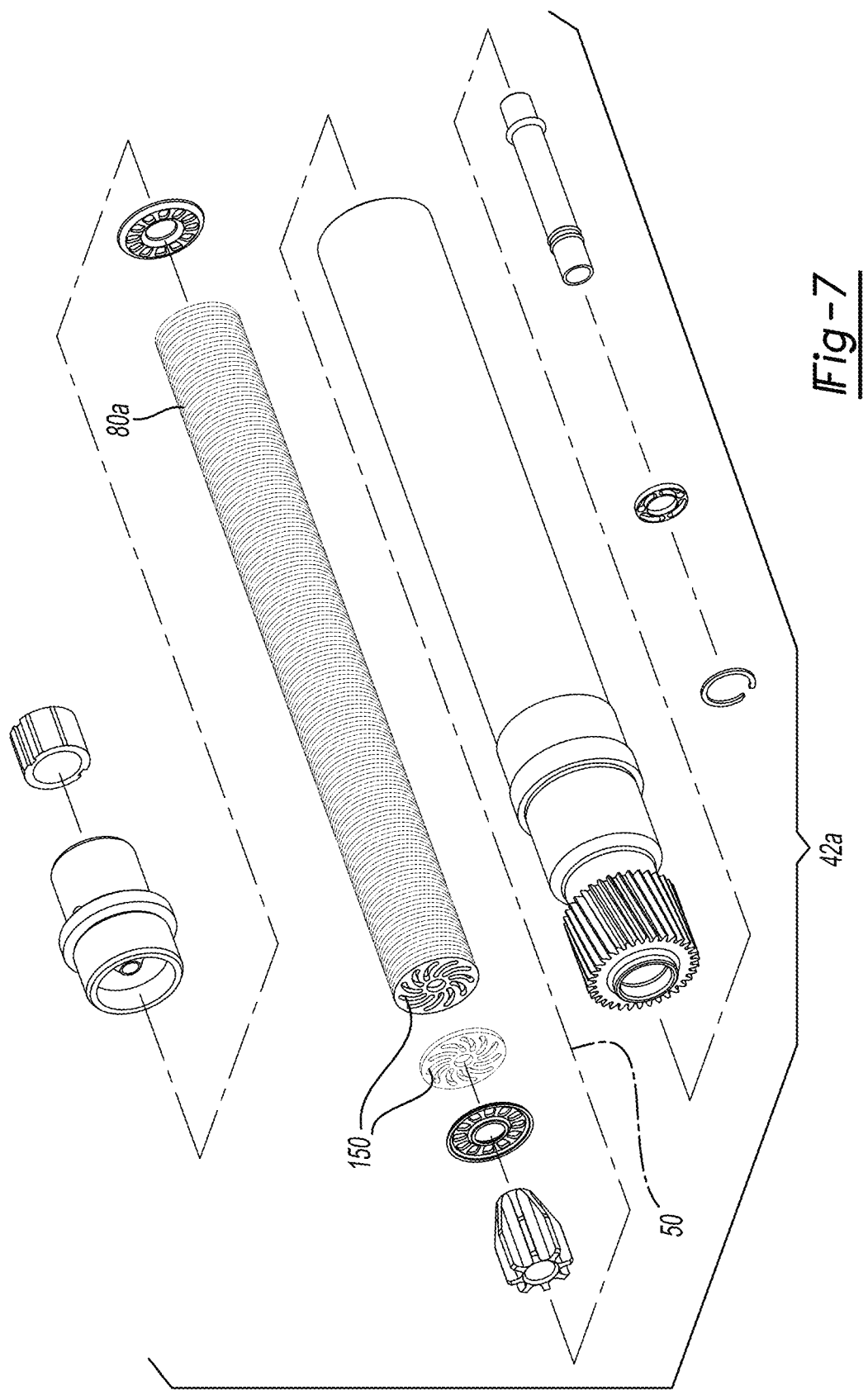
FIG. 7 is an exploded perspective view of a portion of a second motor drive system constructed in accordance with the teachings of the present disclosure, the view illustrating a rotor assembly in more detail.
Figure 8:
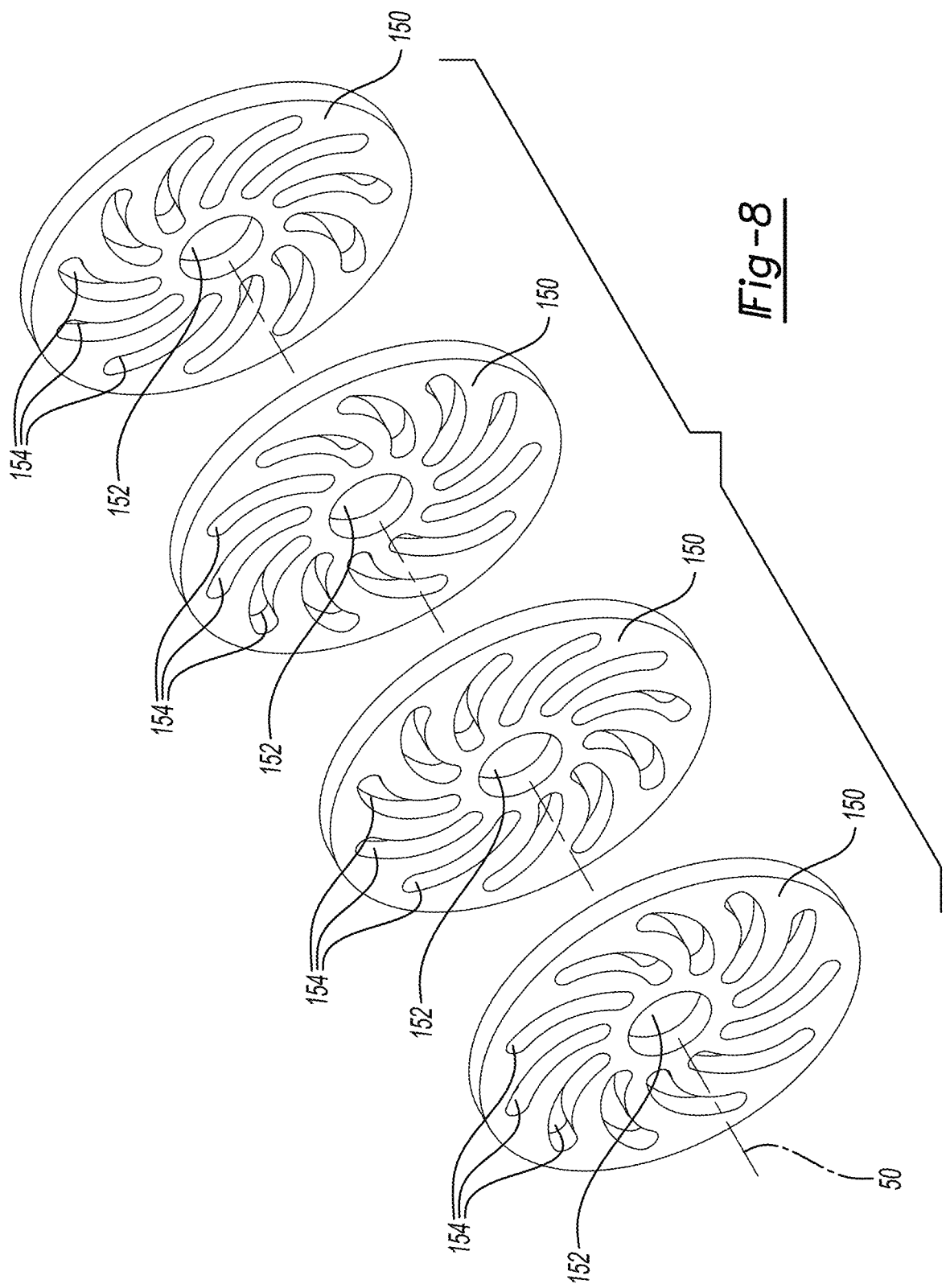
FIG. 8 is an exploded perspective view of a portion of the motor drive system of FIG. 7, the view illustrating several segments that make up an insert body.
Figure 9:
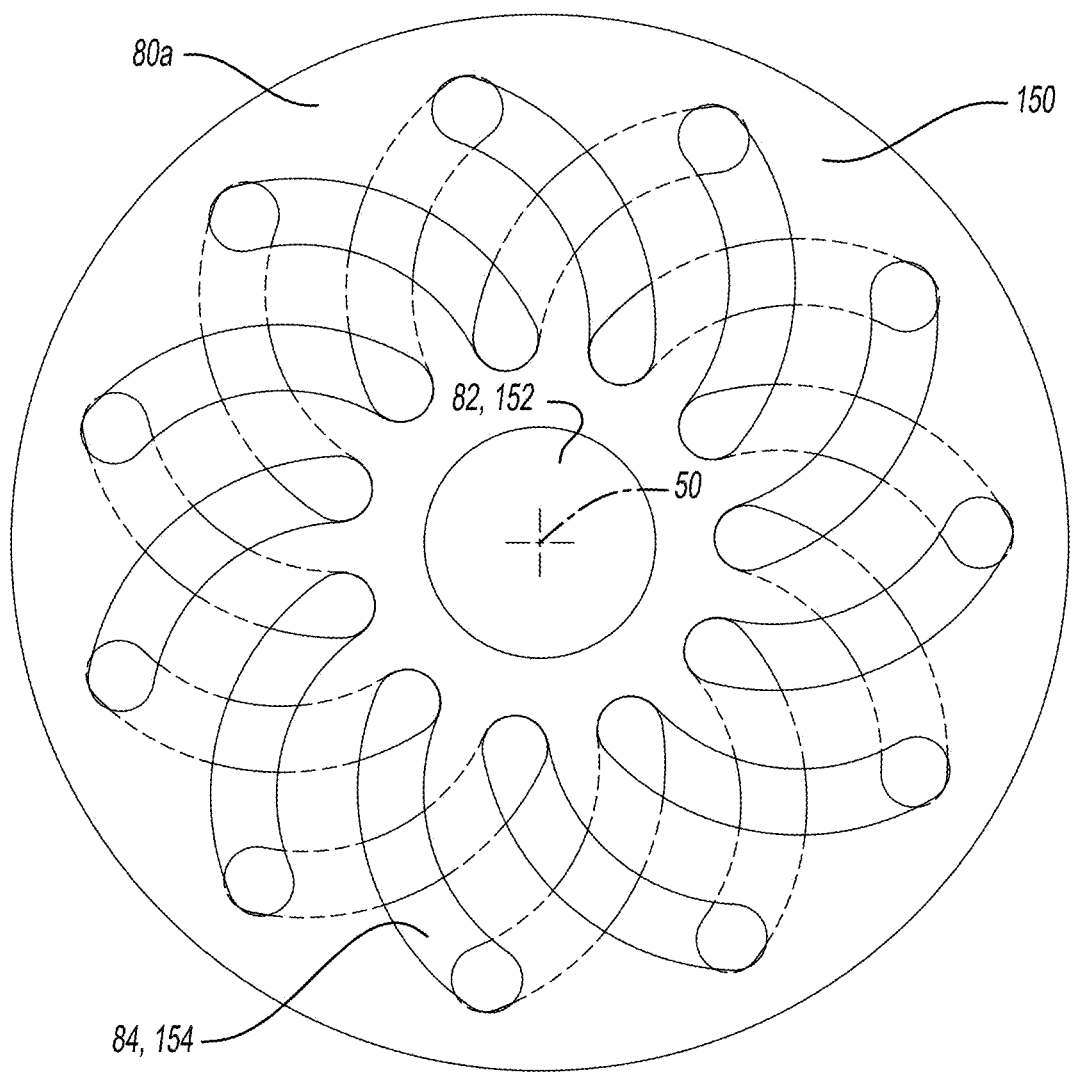
FIG. 9 is an elevation view of a portion of the motor drive system of FIG. 7, the view illustrating the insert body in more detail.

While the electric motor drive system has been illustrated and described has having a rotor assembly with a rotor shaft and a particular type of insert received into the rotor shaft, it will be appreciated that the electric motor drive system could be configured somewhat differently. In the example of FIGS. 7 through 9, the insert body is shown to be composed of a plurality of segments 150 that are fixedly coupled to one another. Each of the segments 150 is a circular disk that defines a first through-hole 152 and a plurality of second through-holes 154 that are disposed circumferentially about the first through-hole 152. The segments 150 are stacked against one another (i.e., face-to-face) such that the first through-holes 152 form the first flow passage 82 and the second through-holes 154 form the plurality of second flow passage 84. The segments 150 can be fixedly coupled to one another via any suitable means, such as brazing. Construction in this manner permits the second flow passage 84 to have any desired contouring or shape. In the example provided, the second through-holes 154 are slots that extend in a radial direction and which curve about the rotational axis 50. Each of the segments 150 can be staggered about the rotational axis 50 by a predetermined amount so that the second flow passages 84 twist about the rotational axis 50. Alternatively, adjacent segments 150 can be flipped so that the second through-holes 154 in one of the segments 150 extend in a first direction about the rotational axis 50 and the second through-holes 154 in an adjacent one of the segments extend in a second direction about the rotational axis 50 that is different from the first direction. Construction in this manner permits one of the slots in the first one of the segment 150 to be in fluid communication with two or more slots in the adjacent one of the segments 150.

Figure 10:
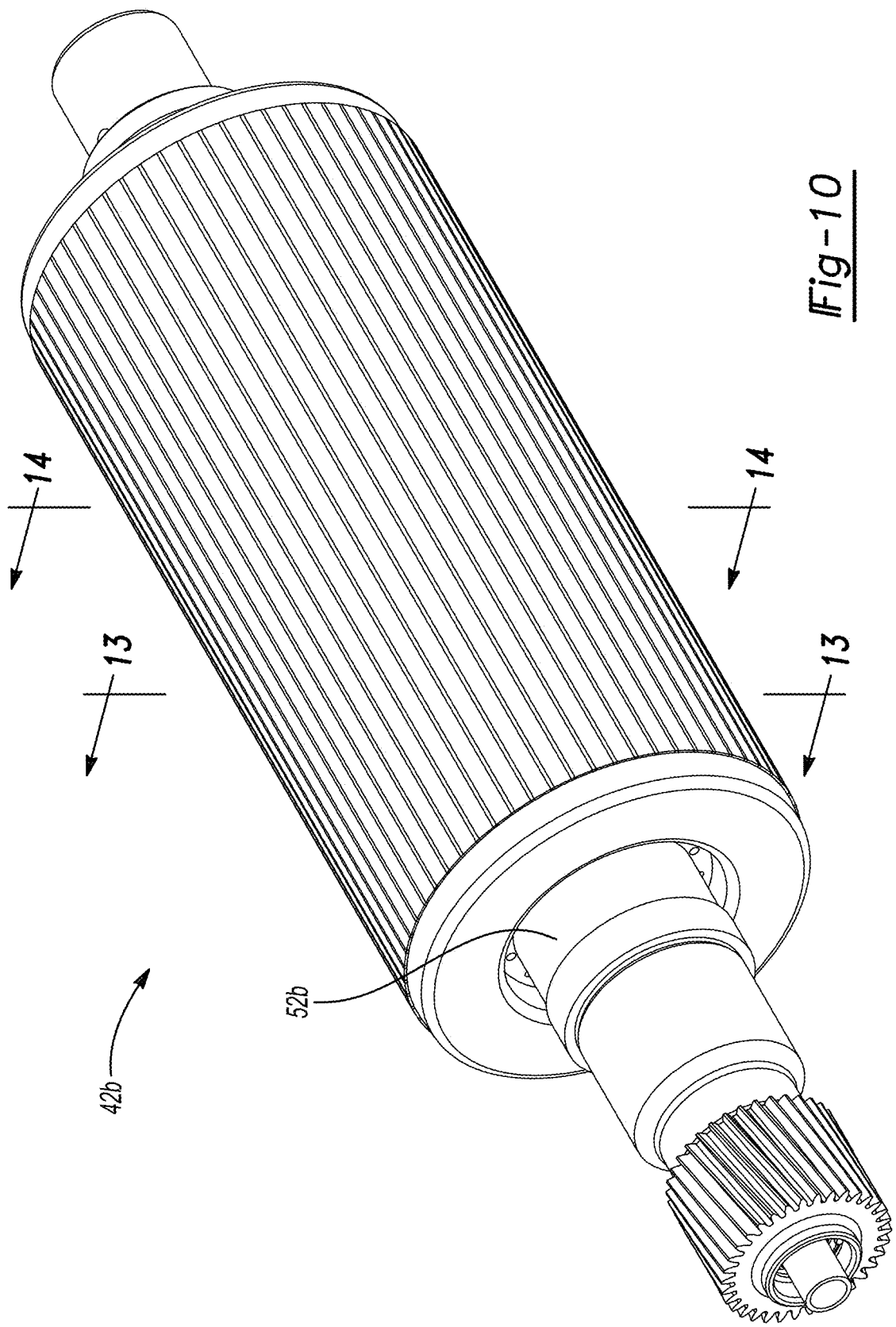
FIG. 10 is a perspective view of a portion of a third motor drive system constructed in accordance with the teachings of the present disclosure, the view illustrating a rotor assembly in more detail.
Figure 11:
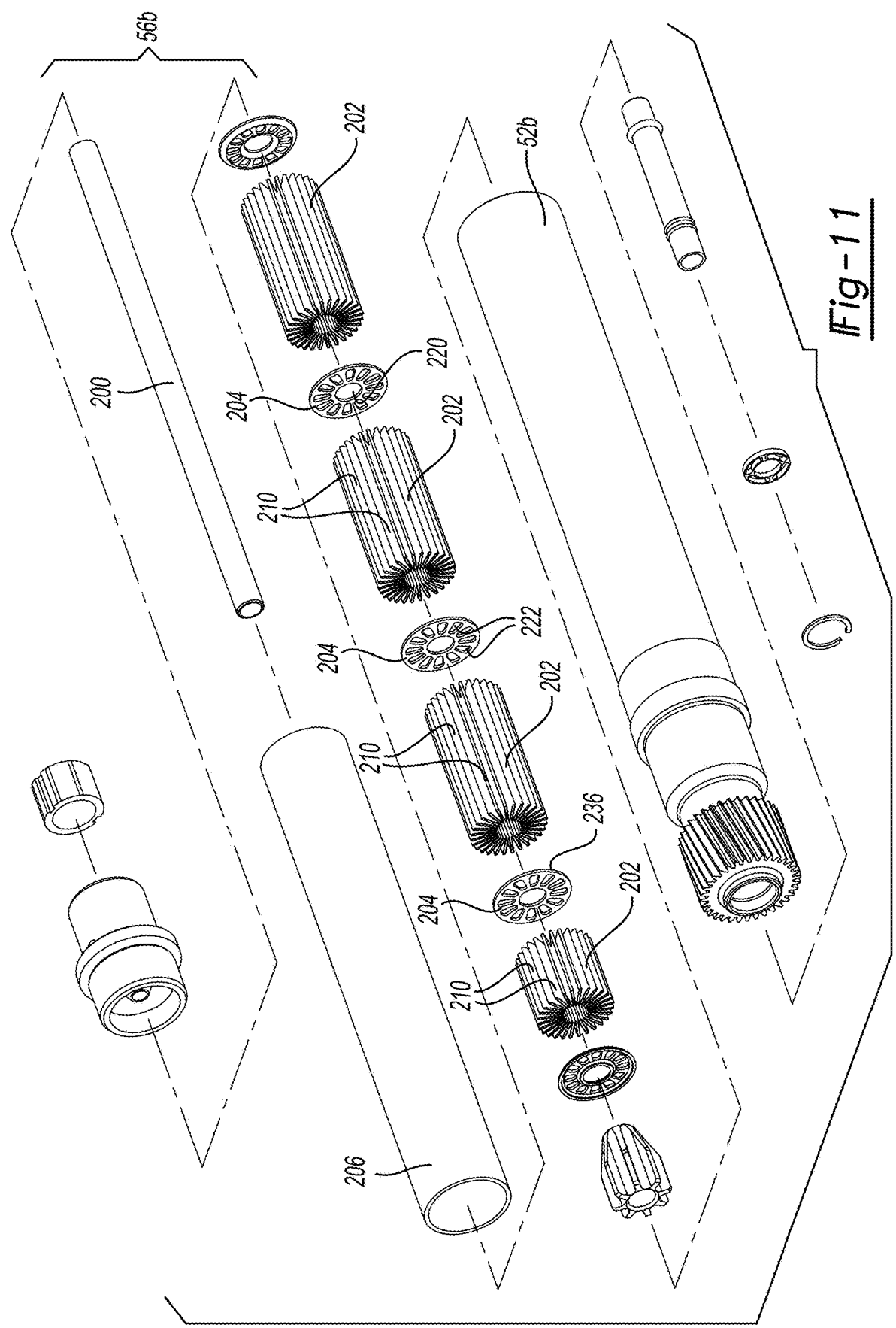
FIG. 11 is an exploded perspective view of a portion of the rotor assembly shown in FIG. 10.
Figure 12:
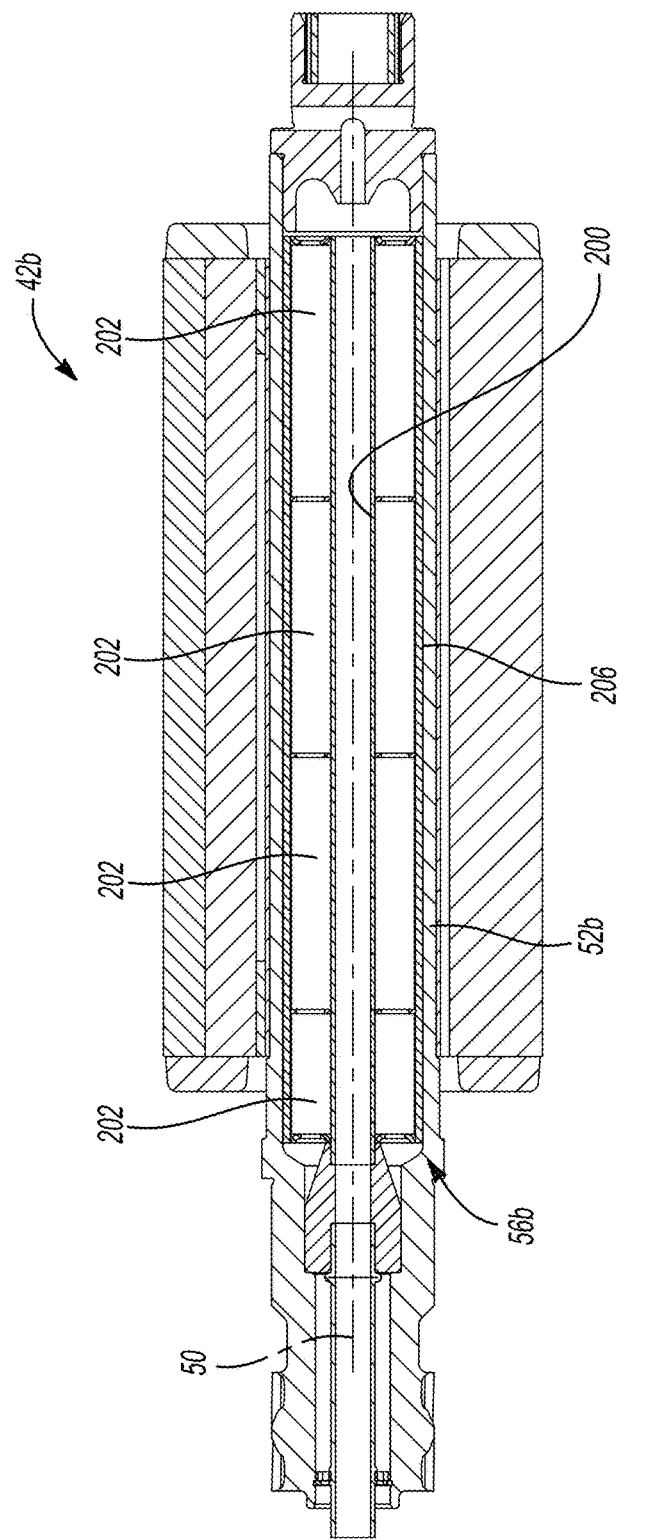
FIG. 12 is a longitudinal section view of the rotor assembly of FIG. 10.

With reference to FIGS. 10 through 12, a portion of another electric drive motor system constructed in accordance with the teachings of the present disclosure is illustrated. The electric drive motor system can be substantially similar to that which is described in detail above, except for the construction of the rotor assembly 42b. In this regard, the rotor assembly 42b includes an insert 56b that is received into the rotor shaft 52b. The insert 56b can comprise a central tube 200, a plurality of fin sets 202, a plurality of separator plates 204, and an outer tube 206. The central tube 200 can be formed of a suitable material that can provide structural strength and can be thermally conductive, such as aluminum.

Figure 13:
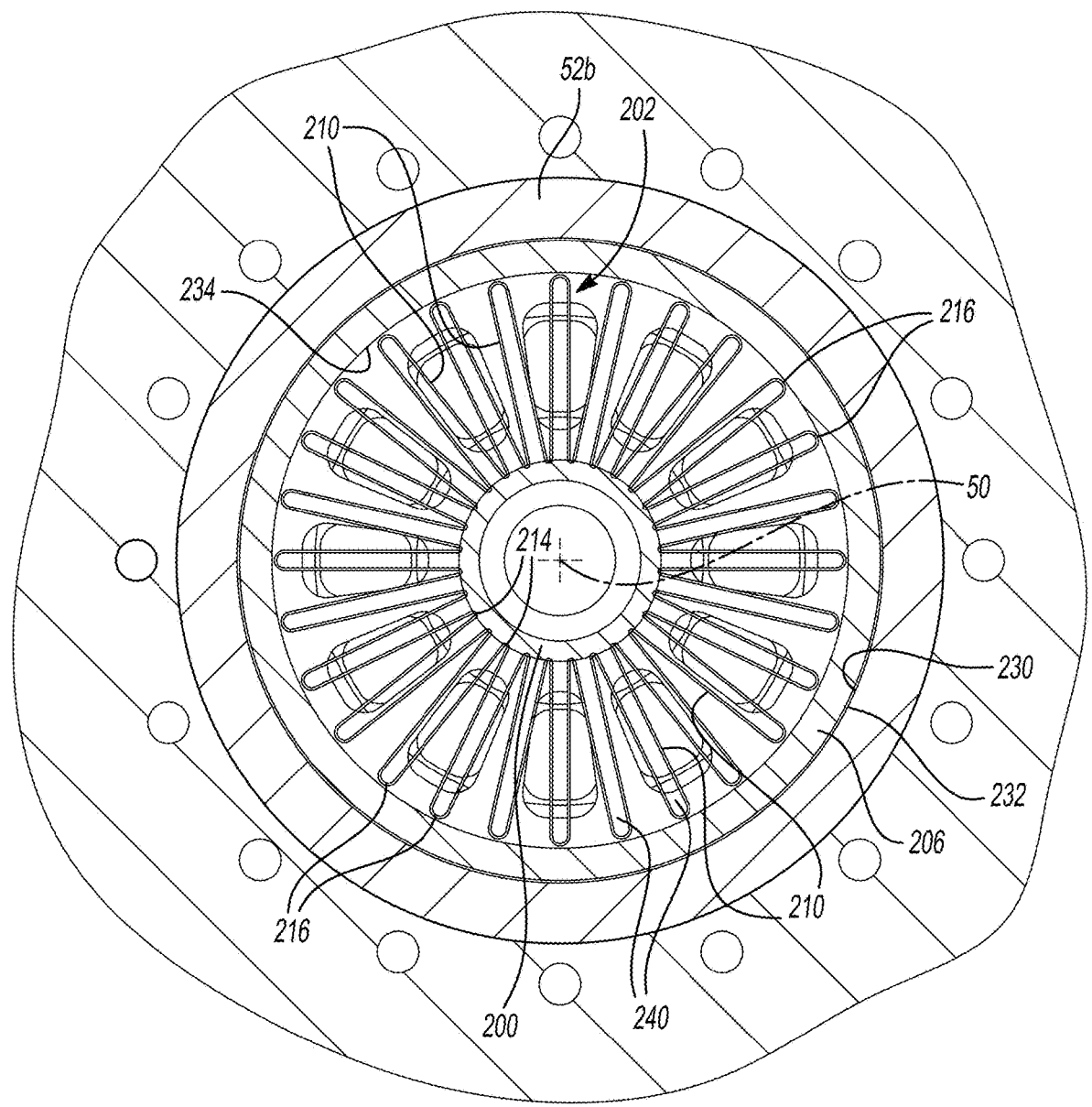
FIG. 13 is a section view taken along the line 13-13 of FIG. 10.

With reference to FIGS. 11 and 13, each of the fin sets 202 can be formed of a sheet of a thermally conductive material, such as aluminum, and can be formed in a pleated manner to form longitudinal fin members 210 that are connected by inner and outer coupling sections 214 and 216. In the example provided, each of the inner and outer coupling sections 214 and 216 is defined by a radius, but it will be appreciated that the inner and outer coupling sections 214 and 216 could be shaped somewhat differently. In this regard, the inner coupling sections 214 and/or the outer coupling sections 216 could be formed as circular segments that interconnect adjacent fin members 210. Each of the fin sets 202 is received onto the central tube 200 such that the inner coupling sections 214 touch the outside surface of the central tube 200.

Figure 14:
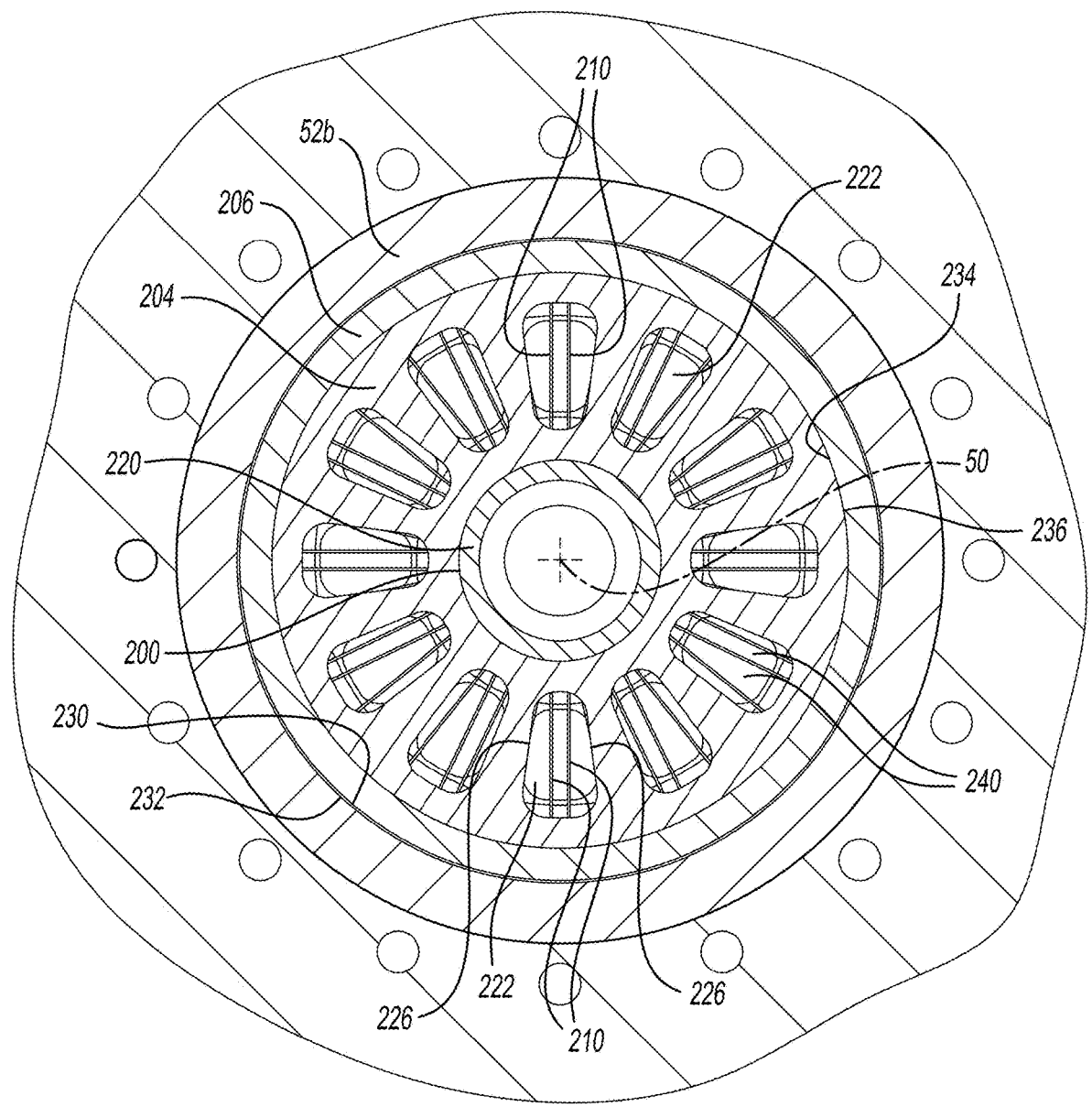
FIG. 14 is a section view taken along the line 14-14 of FIG. 10.

With reference to FIGS. 11 and 14, each separator plate 204 can have a central aperture 220 and a plurality of outer apertures 222 that are disposed circumferentially about the separator plate 204 radially between the central aperture 220 and an outer circumferential surface 236 of the separator plate 204. The separator plates 204 can be received onto the central tube 200 in abutment with one or more of the fin sets 202 such that the surface of the central aperture 220 contacts the outer surface of the central tube 200 and the outer apertures 220 are disposed in-line with circumferential spaces between adjacent fin members 210. Optionally, the circumferentially opposite sides 226 of the outer apertures 222 can be disposed in a non-parallel manner to the fin members 210 so as to cross several fin members 210 as the sides extend between their radially inner and radially outer ends.

With reference to FIGS. 13 and 14, the central tube 200, the fin sets 202 and the separator plates 204 can be received into the outer tube 206. The outer tube 206 has an outer surface 230, which is configured to engage/contact an inside surface 232 of the rotor shaft 52b, and an inner surface 234 that is configured to engage the outer coupling sections 216 of the fin sets 202 and the outer circumferential surfaces 236 of the separator plates 204. If desired, the outer tube 206 can be heated and/or the fin sets 202 and the separator plates 204 can be cooled prior to the assembly of the fin sets 202 and separator plates 204 into the outer tube 206 so that a resulting shrink fit between the outer tube 206 and the fin sets 202 and/or the separator plates 204 can fixedly couple the outer tube 206 to the fin sets 202 and/or the separator plates 204. Additionally or alternatively, the fin sets 202 and/or the separator plates 204 could be bonded to the central tube 200 and/or the outer tube 206 via a thermally conductive bonding material, such as a brazing compound.

During operation of the motor drive assembly, a coolant fluid is introduced to the interior of the central tube 200, while heat is rejected from the rotor shaft 52b, through the outer tube 206 and into the fin sets 202 and separator plates 204. The coolant fluid introduced to the central tube 200 flows out of an opposite end of the central tube 200, and is re-directed through the outer apertures 222 in one of the separator plates 204, into channels 240 that are formed between adjacent ones of the fin members 210. Coolant fluid traveling through the channels 240 is directed out of the end of the insert 56b (FIG. 12) from which the coolant fluid is introduced. Fluid passing through the fin members 210 permits heat to be rejected from the fin sets 202 into the coolant fluid.

Figure 15:
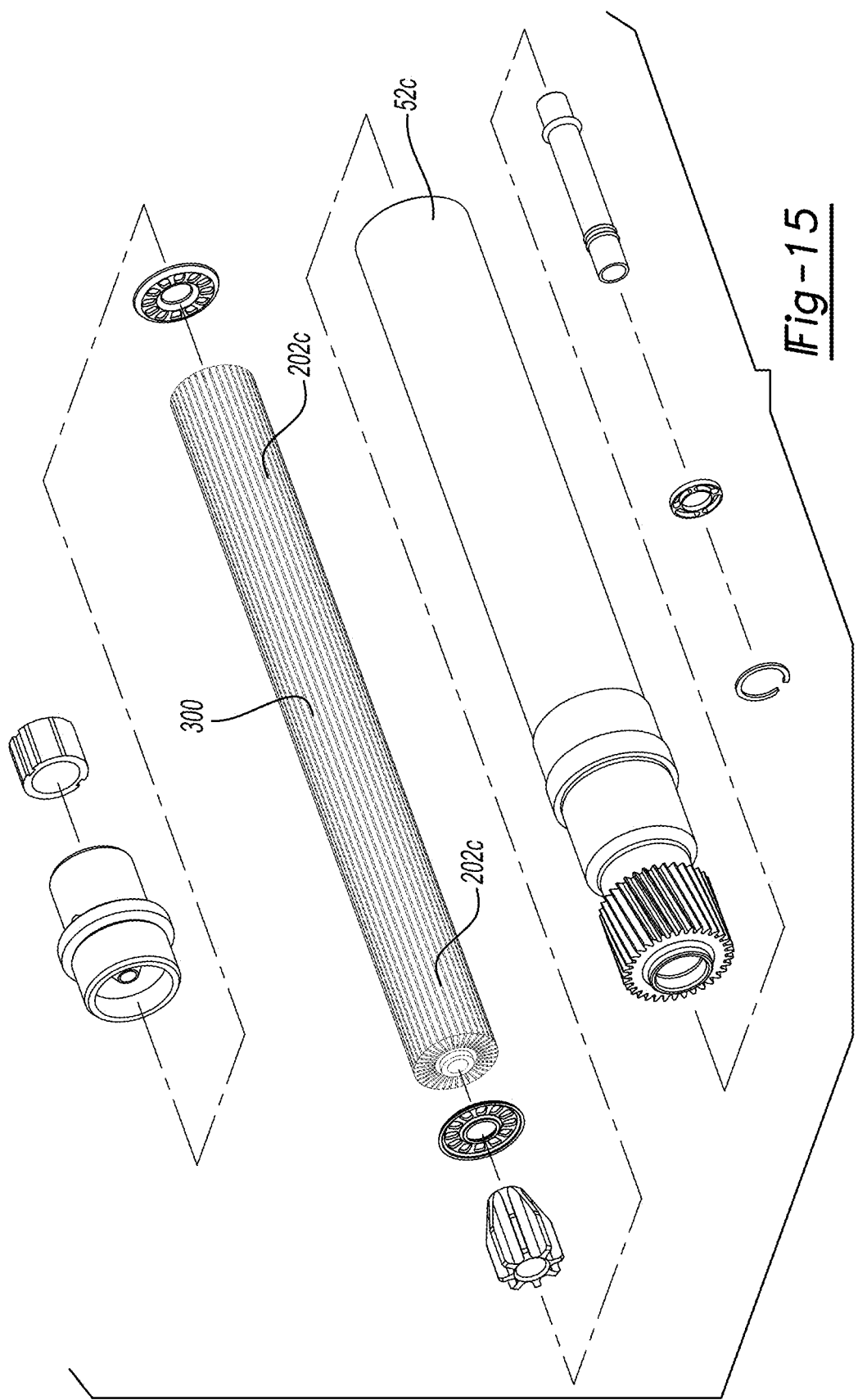
FIG. 15 is an exploded view of a portion of a fourth motor drive system constructed in accordance with the teachings of the present disclosure, the view illustrating a portion of a rotor assembly.
Figure 16:
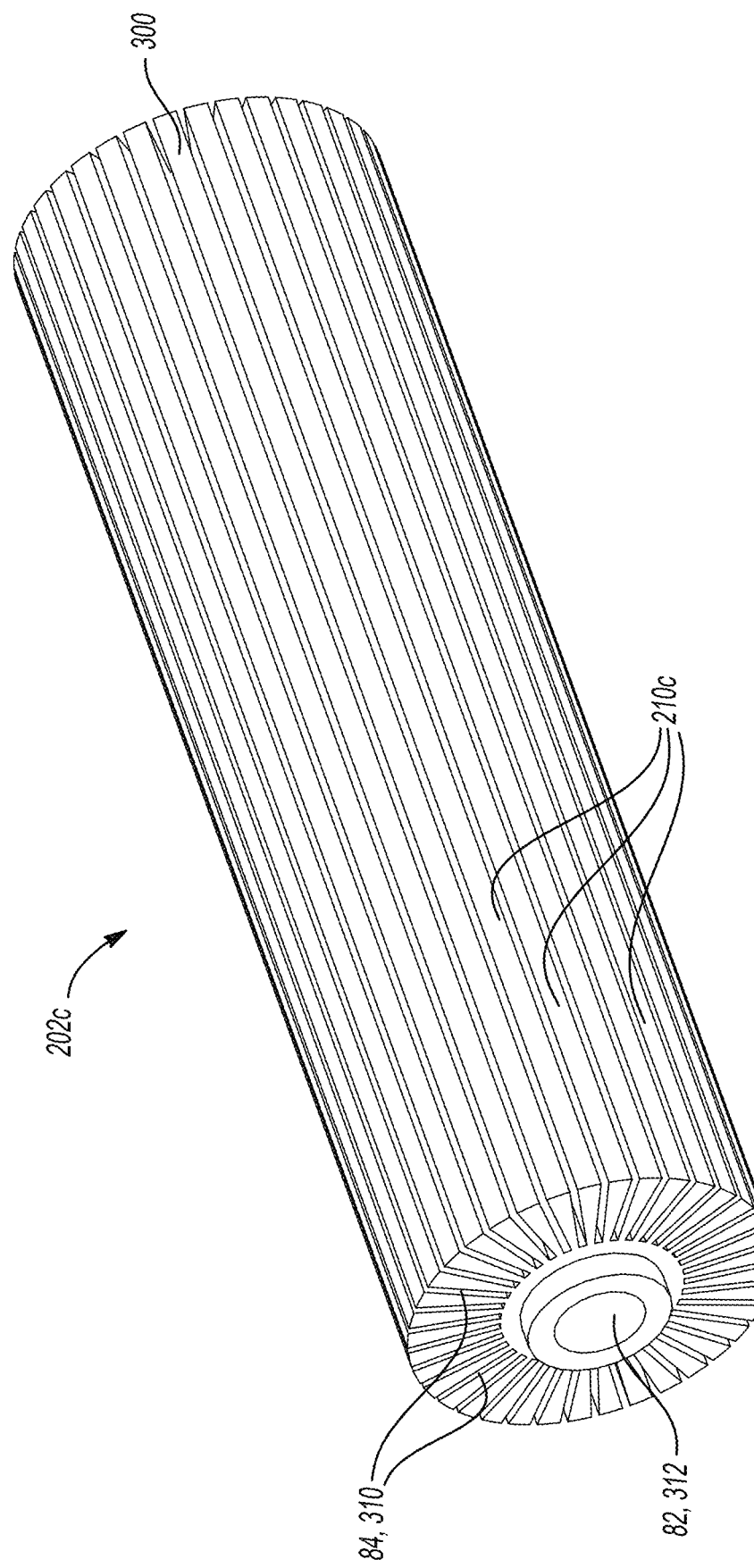
FIG. 16 is an enlarged portion of FIG. 15, illustrating a fin set in more detail.
Figure 17:
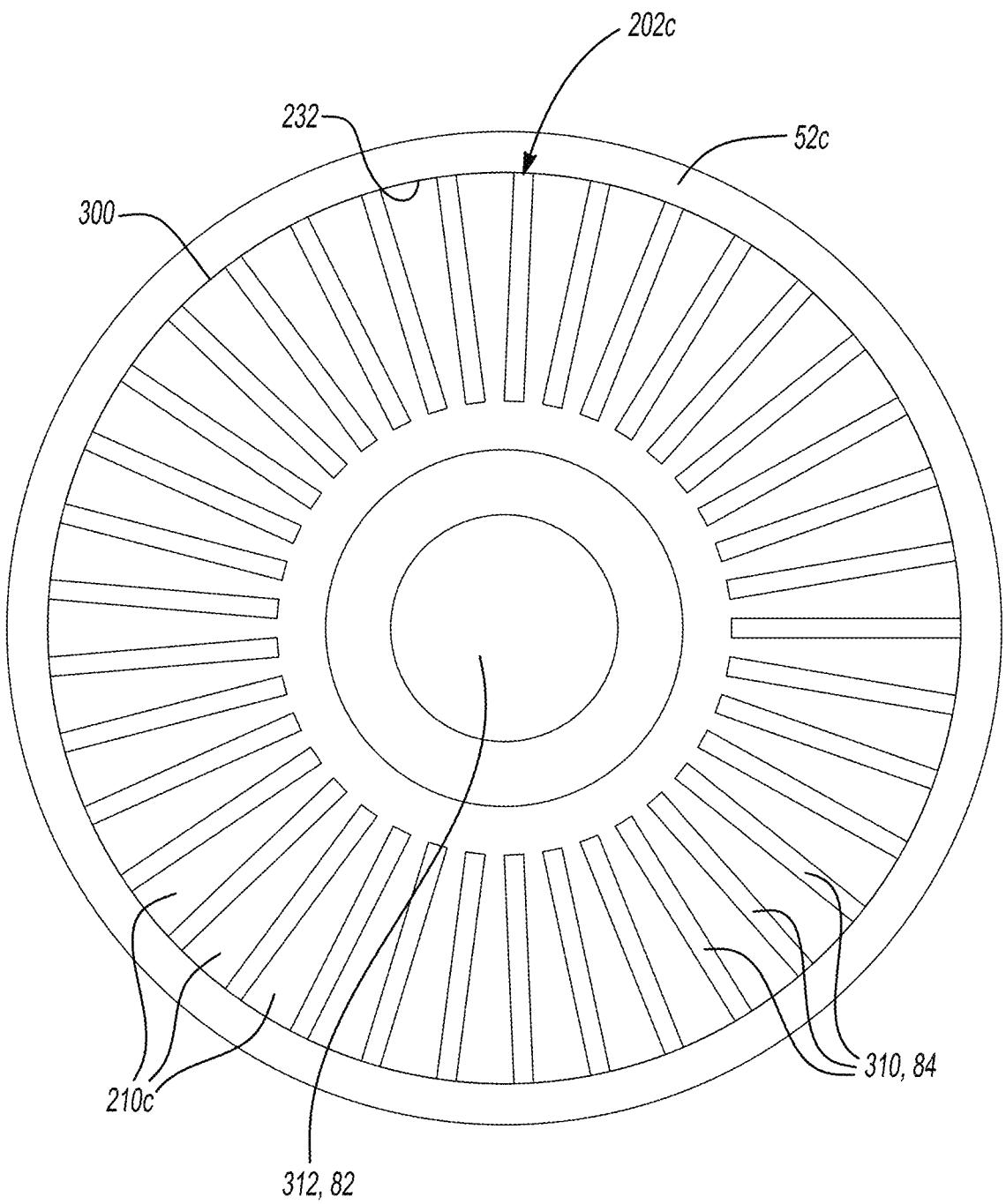
FIG. 17 is a lateral cross section of a portion of the rotor assembly of FIG. 15.

The example of FIGS. 15 through 17 is generally similar to the previous example except that a single fin set 202c is employed. The fin set 202c is unitarily and integrally formed from a solid material, such as compacted and sintered powdered metal, and the outer circumferential surface 300 of the fin set 202c is engaged directly to the inside circumferential surface 232 of the rotor shaft 52c. Each of the fin members 210c can be formed via a machining operation and the outer circumferential surface 300 of the fin set 202c can be machined in a centerless grinding operation. In the particular example provided, the fin members 210c are formed via wire electro-discharge machining, but it will be appreciated that other machining processes, such as milling, grinding or sawing could be employed. It will be appreciated that the longitudinally extending slots 310 that are disposed circumferentially between adjacent fin members 210c comprise the second flow passages 84. The slots 310 are disposed circumferentially about a central hole 312 that is formed through the fin set 202c and can be uniform in their circumferential width. The central hole 312 can define the first flow passage 82. If desired, the fin set 202c can be cooled and/or the rotor shaft 52b can be heated prior to their assembly to permit the fin set 202c to be shrunk fit to the rotor shaft 52b. The slots 310 are void spaces in the fin set 202c and can have a first volume corresponding to between 20% to 45% of a second volume of the material that forms the fin set 202c.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A motor drive system comprising:
an electric motor having a stator and a rotor assembly that is received in the stator and rotatable about a rotational axis, the rotor assembly having a rotor shaft and single fin set, the rotor shaft defining a bore that is disposed longitudinally along the rotational axis, the bore defining an inner circumferential surface, the single fin set being unitarily and integrally formed and having a hub and a plurality of fin members and, wherein a central hole is formed through the hub along the rotational axis, the fin members being fixedly coupled to the hub and extending radially outwardly therefrom, the fin members cooperating to define an outer circumferential surface of the single fin set, the fin members being spaced circumferentially apart from one another about the rotational axis to define a plurality of longitudinally extending slots, the single fin set being received into the bore in the rotor shaft such that the outer circumferential surface of the single fin set engages the inner circumferential surface of the bore in the rotor shaft, and wherein each of the longitudinally extending slots is bounded on a radially outer side by the inner circumferential surface of the bore in the rotor shaft, wherein the central hole forms a first fluid passage that is configured to transmit cooling fluid through the single fin set in a first direction along the rotational axis, and wherein the longitudinally extending slots form a plurality of second fluid passages that are configured to transmit cooling fluid through the single fin set in a second direction along the rotational axis that is opposite the first direction.

2. The motor drive system of claim 1, wherein the fin members engage the inner circumferential surface in a shrink-fit manner.

3. The motor drive assembly of claim 1, wherein the second fluid passages are formed with a uniform circumferential width.

4. The motor drive assembly of claim 1, wherein the second fluid passages define void spaces, and wherein the void spaces have a total volume that is between 20% and 45% of a volume of the single fin set.

5. The motor drive assembly of claim 1, wherein each of the second fluid passages has a centerline that is disposed in an associated flat plane that includes the rotational axis.

6. The motor drive assembly of claim 1, wherein the single fin set is formed of a compacted, sintered powdered metal material.

7. A motor drive system comprising:
an electric motor having a stator and a rotor assembly that is received in the stator and rotatable about a rotational axis, the rotor assembly having a rotor shaft and single fin set, the rotor shaft defining a bore that is disposed longitudinally along the rotational axis, the bore defining an inner circumferential surface, the single fin set being unitarily and integrally formed, wherein a central hole is formed through the single fin set along the rotational axis, wherein a plurality of slots are formed into single fin set, the plurality of slots extending through the outer circumferential surface of the single fin set, each of the slots having a pair of side walls that are spaced circumferentially apart from one another and which are parallel to one another, wherein the central hole forms a first fluid passage that is configured to transmit cooling fluid through the single fin set in a first direction along the rotational axis, and wherein the slots form a plurality of second fluid passages that are configured to transmit cooling fluid through the single fin set in a second direction along the rotational axis that is opposite the first direction.

8. The motor drive system of claim 7, wherein the outer circumferential surface of the single fin set is engaged to the inner circumferential surface in a shrink-fit manner.

9. The motor drive assembly of claim 7, wherein the second fluid passages are formed with a uniform circumferential width.

10. The motor drive assembly of claim 1, wherein the slots define void spaces, and wherein the void spaces have a total volume that is between 20% and 45% of a volume of the single fin set.

11. The motor drive assembly of claim 7, wherein each of the second fluid passages has a centerline that is disposed in an associated flat plane that includes the rotational axis.

12. The motor drive assembly of claim 7, wherein the single fin set is formed of a compacted, sintered powdered metal material.

* * * * *